Figure 1:
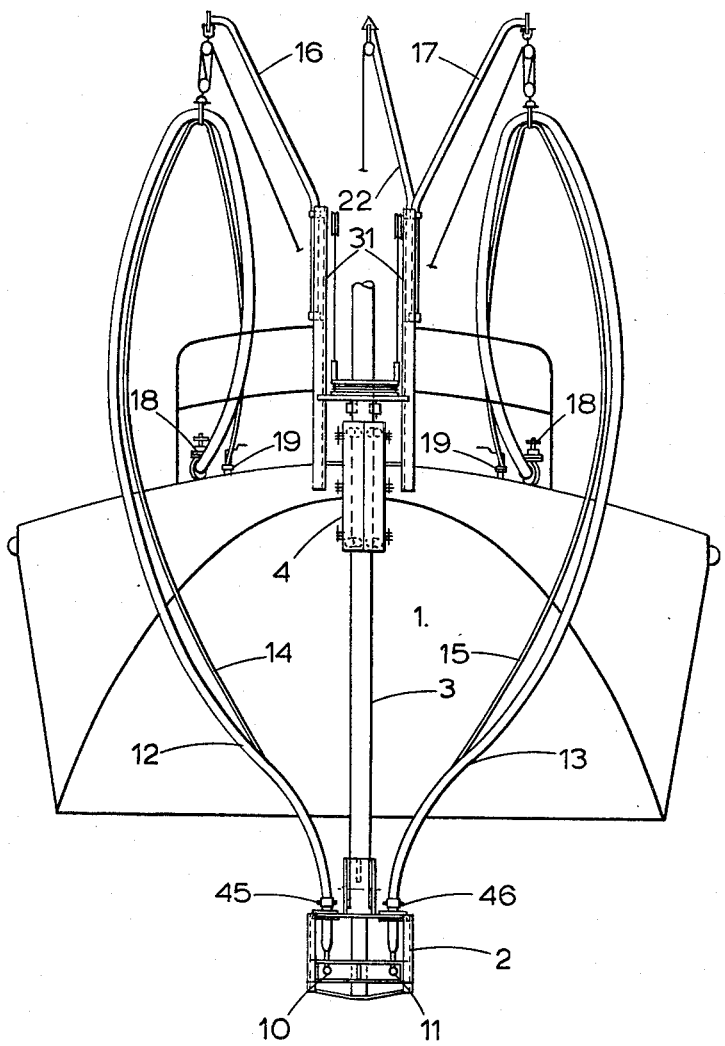

June 8, 1965 W. H. HOLLYOAK 3,187,447
DREDGE WITH NOZZLE MEANS FOR MIXING AIR AND WATER BEFORE
EMISSION THEREOF FROM SAID NOZZLE
Filed Aug. 21, 1962 4 Sheets-Sheet 1

INVENTOR
William Henry Hollyoak

BY

ATTORNEYS

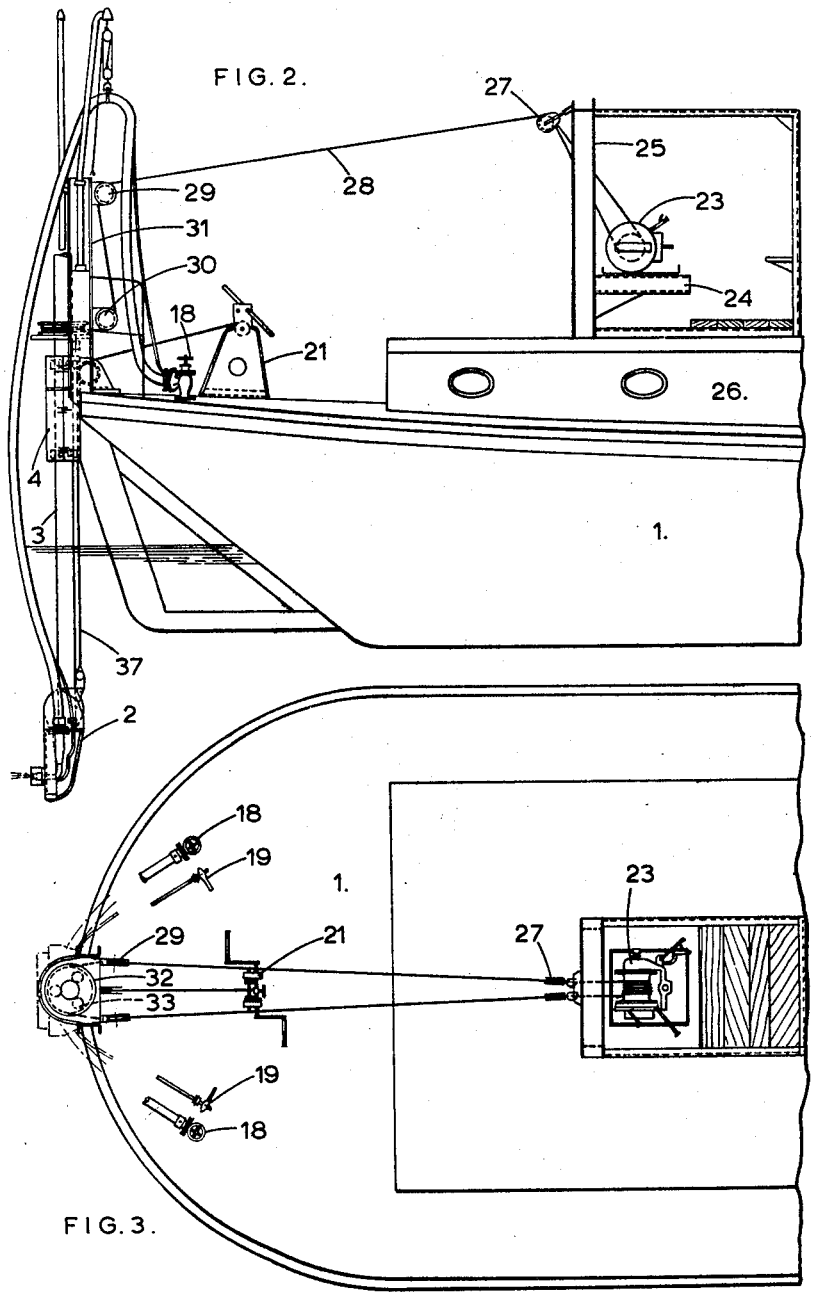

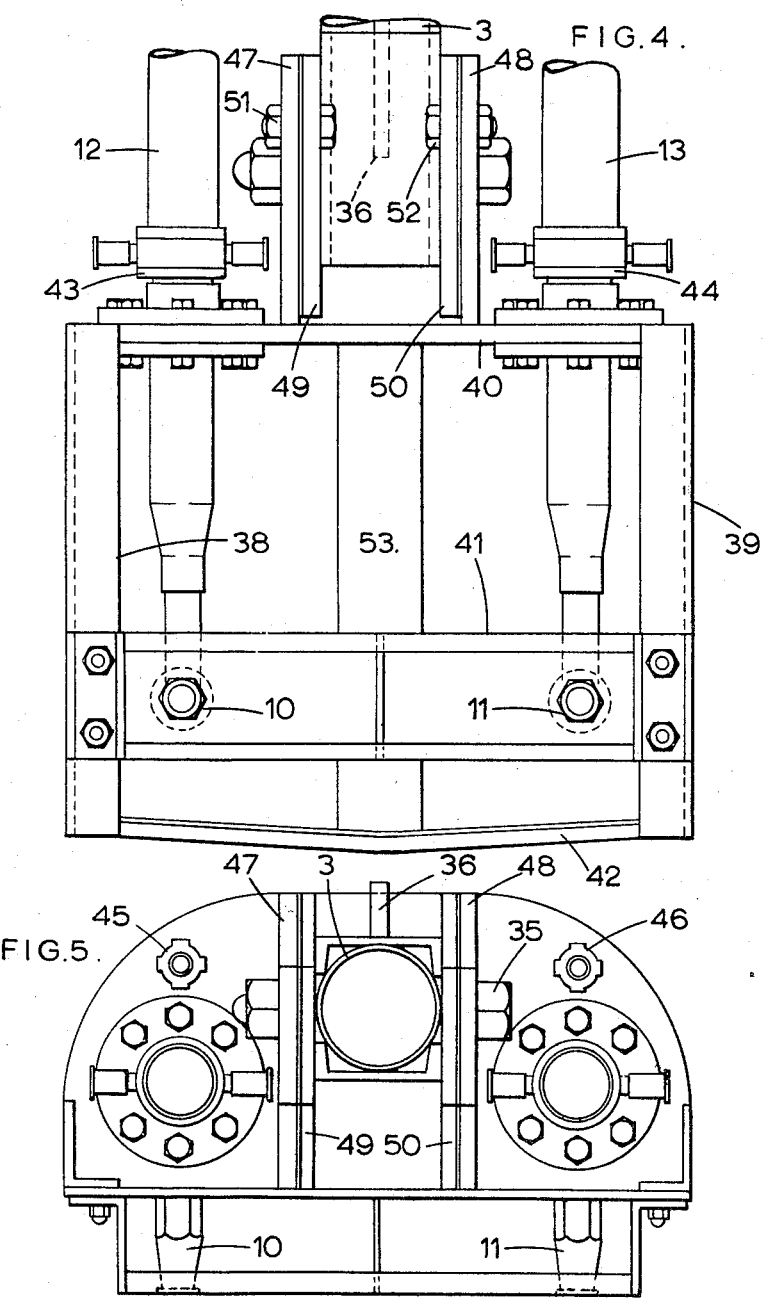

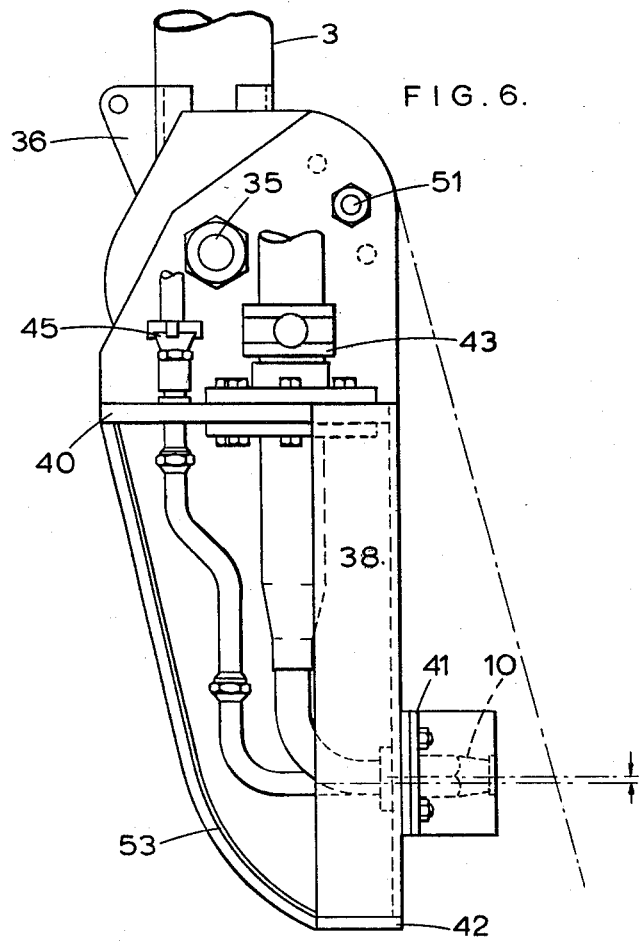
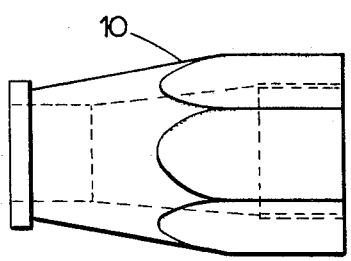

United States Patent Office 3,187,447
Patented June 8, 1965

3,187,447
DREDGE WITH NOZZLE MEANS FOR MIXING AIR AND WATER BEFORE EMISSION THEREOF FROM SAID NOZZLE
William Henry Hollyoak, Sompting, England, assignor to The Proprietors of Hay's Wharf Limited, London, England, a British company
Filed Aug. 21, 1962, Ser. No. 218,269
Claims priority, application Great Britain, Sept. 1, 1961, 31,534/61
6 Claims. (Cl. 37—78)

This invention relates to the clearance of silt, mud and like material, in particular from riverside wharves, ships berths and harbours, and provides for the purpose an installation utilising jets of high pressure water and air led by hose pipes from water pumps and air compressors suitably installed on a water-borne vehicle, hereafter termed a dredger, although the installation may if desired be land-based.

In apparatus for the clearance of silt, mud and like material utilising jets of high pressure water and air led by hose pipes from water pumps and air compressors to jet nozzles, according to the present invention the nozzles are mounted in a jet unit carried by a rigid member so mounted in a vehicle, such as a dredger, or installed on land, as to permit vertical adjustment of the position of the jet unit, and capable also of slewing the latter in a horizontal plane.

Instead of disintegrating nozzles having concentric water and air outlets as heretofore proposed for the purpose, in apparatus according to one embodiment of the present invention the air ducts are terminated at the point of entry into the water pipe so that air mixes with the water before it emerges from a nozzle common to the mixture.

The air inlet to the water pipe is advantageously eccentric to the nozzle and at least a pair of such nozzles are provided for each installation carried by a suitable structure hereafter termed a jet unit capable of being raised and lowered in relation to the dredger.

One embodiment of hydro-pneumatic dredger will now be described with reference to the accompanying drawings wherein:

FIGURE 1 is a stern view,
FIGURE 2 is a partial side elevation and
FIGURE 3 is a partial plan view,
FIGURES 4 to 6 are detail views of the jet unit and
FIGURE 7 shows one of the nozzles.

Referring now to the drawings, but first more particularly to FIGURES 1 to 3, 1 generally designates a dredger and 2 a jet unit.

The latter is carried at the stern of the dredger 1 by a rigid metallic tube 3 mounted in a suitable bearing 4 secured to the stern of the dredger 1 to permit vertical adjustment of the jet unit 2. The metallic tube 3 is also capable of slewing the jet unit 2 in a horizontal plane in the manner hereinafter described.

In the embodiment illustrated the jet unit 2 is shown equipped with two nozzles 10 and 11, flexible hoses 12 and 13 being provided for delivering water at a suitable rate and pressure to the nozzles from a pump or pumps on the dredger.

Similar flexible hoses 14 and 15 serve as air lines delivering compressed air to the nozzles at a suitable pressure, appropriate tackle 16, 17 being provided at the stern of the dredger for positioning the air and water hose to conform with the adjusted position of the jet unit 2.

18 represent delivery control valves for the water hose and 19 control valves for the air lines.

For hoisting and lowering the jet unit 2 a winch 21 is provided in conjunction with a central davit or crane 22 for shifting extensions of the vertical tube 3 at the foot of which the jet unit is secured, while 23 represents a winch for rotating the vertical tube 3 to slew the jet unit 2 in a horizontal plane about the axis of the bearing 4.

The winch 23 is shown mounted on a platform 24 of a superstructure 25 erected on deck house 26, and this superstructure also carries guide pulleys 27 for a radial control wire 28 from winch 23, which wire is led to the stern and thence down over guide pulleys 29 and 30 mounted on structure 31 to a drum 32 on the tube 3.

Although in the jet nozzle 10 illustrated in FIG. 6, the air line 14 is shown eccentric, it should be understood that when the air duct terminates at a point of entry into the water feed to the nozzle such that the air mixes effectively with the water before it emerges from the nozzle, satisfactory results are achieved in clearing silt, mud or like material from the berth, harbor or the like in which the apparatus is used.

The jet unit 2 is shown to a larger scale in FIGURES 4-6 and is a fabricated structure secured by bolt 35 at the foot of the tube 3. 36 in FIGURES 4-6 is a hoisting lug on the tube 3, to which is connected a wire 37 leading from hoisting winch 21.

The jet unit comprises a frame assembly of general rectangular form when viewed from the rear as shown in FIGURE 4, and includes vertical members 38 and 39 bridged by transoms 40, 41 and 42. The upper transome 40 carries couplings 43 and 44 for the water hoses 12 and 13 and also couplings 45 and 46 for the air hoses 14 and 15.

As shown in FIGURE 6, the air line 14 is located eccentrically of the nozzle 10, while the water hose 12 is located centrally of the nozzle. The air line is terminated in the water hose near the point of entry of the hose into the nozzle. This arrangement ensures that the air mixes effectively with the water before it emerges from the nozzle and it is this feature which has enabled satisfactory results to be achieved in clearing silt, mud or like material from berths, harbors or other waterways in which the apparatus is used.

To the upper transom 40 are welded suspension plates 47 and 48 through which plates passes the bolt 35. For the purpose of enabling the jet unit to be tilted, preferably through 15° to each side of the perpendicular, the plates 47 and 48 are pivotally suspended form the bolt 35 at the foot of the tube 3. Plates 49 and 50 are welded to the bottom of such tube providing apertures for locking bolts 51 and 52 temporarily to secure such jet unit in its selected position, i.e. tilted or perpendicular as desired.

Also welded to the upper transom 40 and bridging it and the lower transom 42 is a concave rear strut 53.

The water component of the jets issuing from the nozzles 10 and 11 acts as a vehicle for carrying the air under pressure for considerable distances away from the nozzles. At the same time the angle of the frame to the axis of the dredger is so controlled that the reaction from the force of the jets will cause the dredger to slew back and forth and the jet unit to describe an arc above the surface of the silt. During each sweep of the craft the jet will be applied to a wide area of silt. The air component of the jets sweeping over this area expands rapidly and lifts and aerates the silt which has already been loosened by the force of the water component of the jet.

Experience has proved that silt, mud or the like disintegrated and lifted in this way is returned to its former state of suspension and becomes indistinguishable in its subsequent behavior from the solids carried naturally in any water where silting problems normally arise. Provided that there is even a small flow of water, silt or mud lifted in this manner will be dispersed over such a wide area that the normal rate of deposition of silt or mud for any particular area will, for all practical purposes, remain unaltered.

I claim:
1. Apparatus for effecting clearance of silt, mud and like materials from the bottom of waterways comprising a support structure, a rigid frame assembly, a plurality of jet nozzles fixedly mounted on said frame assembly, bearing means mounted on said support structure, a rigid substantially vertically extending support post rotatably and slidably mounted in said bearing means, said frame assembly being secured to the lower portion of said post for movement therewith, a lift means mounted on said support structure, and connected to said support post for moving it up and down in said bearing means so as to permit vertical adjustment of said frame and the associated jet nozzles relative to the support structure, rotary means mounted on the support structure and connected to said support post for rotating it in said bearing means so as to slew said frame and the associated jet nozzles horizontally, and supply means mounted on said support structure and connected to said jet nozzles for supplying both compressed air and water under pressure thereto in such a manner that the air and water are mixed before being issued from said jet nozzles.

2. Apparatus according to claim 1 wherein said lift means comprises a first winch connected to said support post, and said rotary means comprises a second winch connected to said support post.

3. Apparatus as defined in claim 2 wherein said second winch includes a drum, a cable looped around said support post, the ends of said cable being wound in opposite directions around said drum.

4. Apparatus as defined in claim 1 including pivot means pivotally connecting said frame and the associated jet nozzles to said support posts on a substantially horizontally extending axis, whereby said jet nozzle may be pivoted approximately 15° to either side of horizontal.

5. Apparatus for effecting clearance of silt, mud and like materials from the bottom of waterways comprising a support structure, a rigid frame assembly, a plurality of jet nozzles fixedly mounted on said frame assembly, bearing means mounted on said support structure, a rigid substantially vertically extending support post rotatably and slidably mounted in said bearing means, said frame assembly being secured to the lower portion of said post for movement therewith, a lift means mounted on said support structure and connected to said support post for moving it up and down in said bearing means so as to permit vertical adjustment of said frame and the associated jet nozzles relative to the support structure, rotary means mounted on the support structure and connected to said support post for rotating it in said bearing means so as to slew said frame and the associated jet nozzles horizontally, and supply means mounted on said support structure and connected to said jet nozzles for supplying both compressed air and water under pressure thereto in such a manner that the air and water are mixed before being issued from said jet nozzles, each of said jet nozzles being provided with an outlet aperture, an air inlet and a water inlet, said water inlet and air inlet being concentric and eccentric respectively in relation to said outlet aperture.

6. Apparatus as defined in claim 5 including a frame, said frame including upper, central and lower substantially parallel transoms connected rigidly together, said jet nozzles being mounted on said central transom, air and water conduits connected to said jet nozzles and extending through said upper transom, fluid couplings on the upper ends of said conduits, flexible hoses connected to said fluid couplings and tackle means connected to and adjustably supporting said hoses.

References Cited by the Examiner

UNITED STATES PATENTS

| | | | |
|---|---|---|---|
| 918,302 | 4/09 | Eliel | 37—67 |
| 961,788 | 6/10 | Moran | 37—78 |
| 1,135,001 | 4/15 | Durham | 239—398 X |
| 1,590,115 | 6/26 | Nicholson | 239—398 |
| 2,678,203 | 5/54 | Huff | 37—78 |
| 2,852,868 | 9/58 | Talbott | 37—78 |
| 2,953,306 | 9/60 | Dijkotra | 239—419 |
| 3,019,535 | 2/62 | Talbott | 37—78 |

FOREIGN PATENTS

| | | |
|---|---|---|
| 595,291 | 12/47 | Great Britain. |
| 614,582 | 12/48 | Great Britain. |
| 804,773 | 11/58 | Great Britain. |

BENJAMIN HERSH, *Primary Examiner.*
ROBERT C. RIORDON, *Examiner.*